United States Patent Office 3,322,775
Patented May 30, 1967

3,322,775
QUATERNARY AMMONIUM SALTS OF [4-(3-AMINOALKANOYL)PHENOXY] ALKANOIC ACIDS
Edward J. Cragoe, Jr., Lansdale, Pa., assignor to Merck & Co., Inc., Rahway, N.J., a corporation of New Jersey
No Drawing. Filed Nov. 26, 1963, Ser. No. 326,252
11 Claims. (Cl. 260—294)

This invention relates to quaternary ammonium salts derived from [4-(3-aminoalkanoyl)phenoxyl]alkanoic acids, which are useful as diuretics and as intermediates in preparing [4-(2-methylenealkanoyl)phenoxy]alkanoic acids having valuable pharmacological properties.

The novel quaternary salts are compounds having the following structure

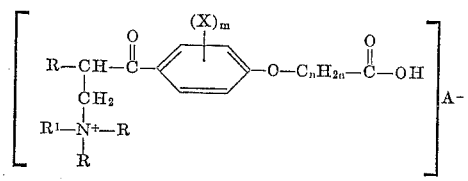

where R is a member selected from the group consisting of hydrogen, alkyl, trifluoromethyl-lower alkyl, aryl, aralkyl, cycloalkyl, alkylcycloalkyl, phenoxy, phenylthioalkyl, alkylphenyloxy, phenylalkylthio and halophenylalkyl, e.g., methyl, ethyl, propyl, butyl, isopropyl, isobutyl, pentyl, 2,2,2-trifluoroethyl, 3,3,3-trifluoropropyl, 2,2,2-trifluoroisopropyl, phenyl, benzyl, phenylethyl, cyclopentyl, cyclohexyl, 4-methylcyclohexyl, benzylthio, tolyloxy, phenylethylthio, and 4-chlorobenzyl, each of the $R^1$ radicals represents a member selected from the group consisting of lower alkyl and, together with the nitrogen atom to which they are attached, a heterocyclic ring selected from the group consisting of 1-pyrrolidinyl, piperidino and morpholino, $R^2$ is a member selected from the group consisting of lower alkyl and benzyl, X is a member selected from the group consisting of hydrogen, halogen, e.g., chlorine, bromine, fluorine and iodine, lower alkyl, lower alkoxy, trifluoromethyl, nitro and, taken together, two X radicals on adjacent carbon atoms of the benzene ring may be combined to form a 1.3-butadienylene chain (i.e., —CH=CH—CH=CH—). $A^-$ is a non-toxic pharmacologically acceptable anion, e.g., halide, i.e., chloride, bromide or iodide, sulfate, etc, m is an integer having a value less than 3, and n is an integer having a value of 1–5.

The above compounds are prepared by the reaction of a [4-(3-aminoalkanoyl)phenoxy]acetic acid with a quaternizing agent according to the following equation:

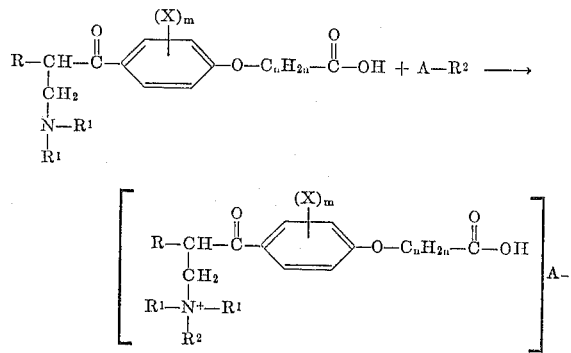

where A—$R^2$ is a quaternizing agent and R, $R^1$, $R^2$, X, $A^-$, m and n are as defined above. Suitable quaternizing agents include, for example, alkyl halides and alkyl sulfates, such as methyl iodide, ethyl iodide, dimethyl sulfate, etc. Specific reaction conditions of temperature, pressure, solvent, etc., are not critical to the success of the reaction, but the process has been found to proceed most advantageously using a low molecular weight alcohol as a solvent, for example, methanol or ethanol, and reaction temperatures of 20–100° C.

The amines employed as starting materials in the process are prepared by the well-known Mannich reaction, which comprises the condensation of formaldehyde or paraformaldehyde with a (4-acylphenoxy)acetic acid in the presence of an acid addition salt of a secondary amine. Suitable secondary amines are, for example, dialkylamines, such as dimethylamine, piperidine, pyrrolidine and morpholine. The following equation illustrates this method of preparing the amine reactants:

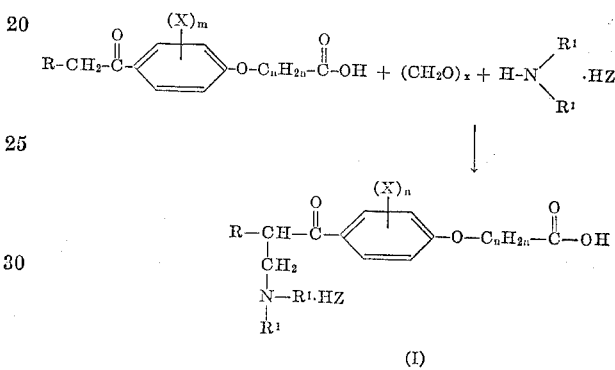

(I)

where R, $R^1$, X, m and n are as defined above, x is an integer having a value of one or a number greater than one and Z is the anion of an organic or inorganic acid, e.g., halide or acetate.

The quaternary ammonium salts of the invention exhibit highly useful diuretic properties and pharmacological studies demonstrate that they possess the unique property among diuretic agents in that they can cause more electrolyte to be excreted than can be caused to be excreted by known diuretic agents. Because of this property, they are useful in the treatment of conditions resulting from an excesively high concentration of electrolyte in the body or an excesively high retention of fluid in the body, such as in the treatment of edematous conditions resulting, for example, from congestive heart failure.

The instant quaternary ammonium salts are also useful as chemical intermediates in the preparation of [4-(2-methylenealkanoyl)phenoxy]acetic acids. The said salts are easily converted to their corresponding methylene derivatives by treating the former with an aqueous solution of a weak base; generally, the reaction is conducted in an aqueous medium but the nature of the solvent is not necessarily critical and we have found that the reaction proceeds most advantageously in any similar media as, for example, in the presence of mixtures of water and organic solvents. While various weak bases may be used to convert the salts to their corresponding methylene derivatives, I have employed sodium bicarbonate and potassium bicarbonate for this purpose with especially good results. Following the treatment of the quaternary ammonium compound with the weak base the reaction mixture is treated with an acid, for example an aqueous solution of hydrochloric acid, to precipitate the [4-(2 - methylenealkanoyl)phenoxy]acetic acid product. The reaction can be illustrated by the following equation:

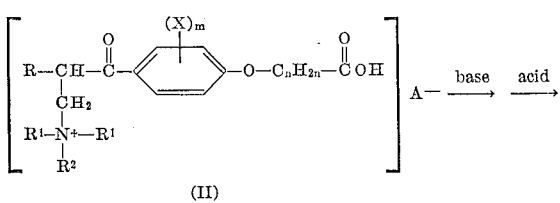

(II)

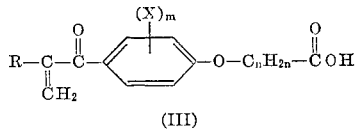

(III)

wherein R, $R^1$, $R^2$, X, $A^-$, $m$ and $n$ are as hereinbefore defined. Like the quaternary ammonium compounds from which they are derived pharmacological studies of the [4-(2-methylenealkanoyl)phenoxyl]acetic acids depicted as III in the above equation demonstrate that they also possess highly active diuretic, natriuretic and chloruretic properties. Furthermore, they possess the unique property among diuretic agents in that they can cause from two to five times more electrolyte to be excreted than can be caused to be excreted by known diuretics. Thus, while most known diuretic agents reach a threshhold or ceiling in the amount of electrolyte they can cause to be excreted (which is not exceeded even when the dose of agent is increased), the [4-(2 - methylenealkanoyl)phenoxy]acetic acid products can bring about the excretion of from two to five or more times this ceiling value.

A preferred embodiment of the invention is the class of [4-(3-ammoniumalkanoyl)phenoxy]acetic acids depicted infra:

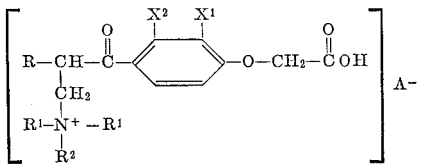

wherein R is a member selected from the group consisting of lower alkyl and trifluoromethyl-lower alkyl, $R^1$ and $R^2$ represent lower alkyl, $X^1$ and $X^2$ each represents a member selected from the group consisting of hydrogen, halogen, lower alkyl, trifluoromethyl and, taken together, the $X^1$ and $X^2$ radicals may be combined to form a 1,3-butadienylene chain (i.e., —CH=CH—CH=CH—) and $A^-$ is a non-toxic pharmacologically acceptable anion, e.g., halogen. The above-described class of compounds exhibit particularly good diuretic, natriuretic and chloruretic properties and are thus especially useful agents in the treatment of conditions associated with electrolyte and fluid retention.

The following examples illustrate the quaternary ammonium salts of the invention and the methods for their preparation.

EXAMPLE 1

[3-fluoro-4-[2-(trimethylammoniummethyl)butyryl]phenoxy]-acetic acid iodide

Step A.—(3-fluoro - 4 - butyrylphenoxy)acetic acid.—Powdered aluminum chloride (108.5 g., 0.815 mole) and carbon disulfide (230 ml.) are placed in a one-liter, four-necked flask equipped with a stirrer, dropping funnel, reflux condenser and internal thermometer. (3-fluorophenoxy)acetic acid (42.5 g., 0.25 mole) is added in portions with stirring and then butyryl chloride (33.3 g., 0.312 mole) is added dropwise with stirring over a period of 0.5 hours at a temperature of about 22–26° C. After stirring one hour at room temperature the reaction flask is placed in a water bath and the temperature maintained at 50° C. for three hours. The carbon disulfide is then decanted and the residual aluminum complex is added to a mixture of 500 g. of ice and 125 ml. of concentrated hydrochloric acid. There is thus obtained (3-fluoro-4-butyrylphenoxy)acetic acid which after crystallization from 1,000 ml. of benzene melts at 131.5–133.5° C.; the yield is 40 g. (67%).

Analysis—Calculated for $C_{12}H_{13}FO_4$: C, 60.00; H, 5.45; F, 7.91. Found: C, 60.29; H, 5.50; F, 7.92.

Step B.—[3-fluoro-4-[2 - (dimethylaminomethyl)butyryl]phenoxy]acetic acid hydrochloride.—In a 100 ml. round flask equipped with an outlet tube suitable for application of intermittent suction, an intimate mixture of (3-fluoro - 4 - butyrylphenoxy)acetic acid (9.6 g., 0.04 mole), paraformaldehyde (1.4 g., 0.047 mole), dry dimethylamine hydrochloride (3.56 g., 0.044 mole) and glacial acetic acid (0.5 ml.) is heated on the steam bath for about 1.5 hours. During this period suction is applied for about one minute at 15-minute intervals. The viscous, homogenous mixture obtained is triturated with 100 ml. of ether. The product is recrystallized from a mixture of isopropyl alcohol and ether to give 9.6 g. (73%) of [3-fluoro-4 - [2 - (dimethylaminomethyl)butyryl]phenoxy] acetic acid hydrochloride, M.P. 173.5–175.5° C.

Analysis—Calculated for $C_{15}H_{21}ClFNO_4$: C, 53.97; H, 6.34; N, 4.20. Found: C, 54.16; H, 6.63; N, 4.07.

Step C—[3 - fluoro - 4 - [2 - (trimethylammoniummethyl)-butyryl]phenoxy]acetic acid iodide.—A 300 ml., 3-necked round-bottomed flask fitted with stirrer, condenser, dropping funnel and calcium chloride tube is charged with [3-fluoro-4-[2-(dimethylaminomethyl)-butyryl]phenoxy]acetic acid hydrochloride (10.3 g., 0.031 mole) and sodium hydroxide (1.24 g., 0.031 mole) in isopropyl alcohol (100 ml.). Methyl iodide (52 g., 0.366 mole) is added dropwise over two hours while the mixture is stirred and heated at 90° C. on a steam bath. The mixture is cooled and the precipitated sodium chloride is removed by filtration. The filtrate is concentrated by vacuum distillation and treated with ether to obtain [3-fluoro - 4 - [2 - (trimethylammoniummethyl)butyryl] phenoxy]-acetic acid iodide.

The following example illustrates the method of converting the quaternary ammonium compounds of the invention to their corresponding pharmacologically useful [4-(2methyleneacyl)phenoxy]alkanoic acid counterparts.

EXAMPLE 2

[3-fluoro-4-(2-methylenebutyryl)phenoxy]acetic acid

The [3 - fluoro - 4 - [2 - (trimethylammoniummethyl) butyryl]phenoxy]acetic acid iodide from Step C of Example 1 is dissolved in water (150 ml.) and saturated aqueous sodium bicarbonate (50 ml.) is added and the mixture heated on the steam bath for 75 minutes. After cooling, the solution is acidified with concentrated hydrochloric acid, extracted with 300 ml. of ether and the ether extract dried over sodium sulfate. The ether is removed in vacuo and the residue (5.4 g.) dissolved in hot benzene (40 ml.), treated with warm cyclohexane (125 ml.) and cooled. The light yellow solid which forms is recrystallized from a mixture of benzene and cyclohexane, filtered and dried to give [3-fluoro-4-(2-methylenebutyryl)phenoxy]acetic acid, M.P. 84–85.5° C. (Corr.).

Analysis.—Calculated for $C_{13}H_{13}FO_4$: C, 61.90; H, 5.20. Found: C, 62.35; H, 5.35.

By substituting the appropriate (4-alkanoylphenoxy) acetic acid for the (3-fluoro-4-butyrylphenoxy)acetic acid of Example 1 and following the procedure described therein, the corresponding ammonium salt is prepared. The following equation and accompanying table depict the last step in the preparation of the quaternary compounds of the invention and illustrate the starting materials of the process and the products derived therefrom:

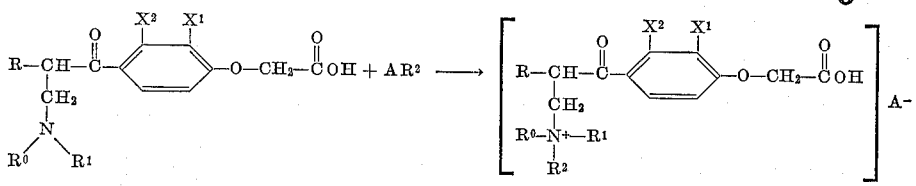

TABLE I

| Ex. | R | R⁰ | R¹ | R² | A | X¹ | X² |
|---|---|---|---|---|---|---|---|
| 3 | —C₂H₅ | —CH₂—(CH₂)₃—CH₂— | | —CH₂—⌬ | Cl | H | Cl |
| 4 | —C₂H₅ | —CH₃ | —CH₃ | —CH₃ | Br | Cl | Cl |
| 5 | —C₂H₅ | —CH₃ | —CH₃ | —CH₃ | I | CH₃ | CH₃ |
| 6 | —C₂H₅ | —CH₃ | —CH₃ | —C₂H₅ | I | —CH=CH—CH=CH₂— | |
| 7 | —C₂H₅ | —CH₃ | —CH₃ | —CH₃ | I | Cl | CH₃ |
| 8 | —C₂H₅ | —CH₂—(CH₂)₃—CH₂— | | —CH₃ | I | CH₃ | Cl |
| 9 | —CH—CH₃<br>   CH₃ | —CH₃ | —CH₃ | —C₂H₅ | I | H | Cl |
| 10 | —CH—CH₃<br>   CH₃ | —CH₃ | —CH₃ | —C₂H₅ | I | Cl | Cl |
| 11 | —CH₂—CF₃ | —CH₃ | —CH₃ | —CH₃ | I | CH₃ | CH₃ |
| 12 | —CH—CH₃<br>   CF₃ | —CH₃ | —CH₃ | —CH₃ | I | H | CH₃ |

It is to be understood that the above examples are illustrative only and the invention is not to be construed as being limited thereto. Any [4-(3-aminoalkanoyl)phenoxy]alkanoic acid falling within the class of amine reactants depicted in the preceding equation may be substituted for the [3-fluoro-4-[2-(dimethylaminomethyl) butyryl]phenoxy]acetic acid of Step C in Example 1 to prepare the corresponding quaternary salt. The said amine reactants are prepared by the Mannich reaction disclosed in Step B and the (4-alkanoylphenoxy)acetic acids employed as the starting materials in preparing the said amines are prepared by the method set forth in Step A of Example 1. It would thus be obvious to one skilled in the art, in view of the methods of preparation set forth in Steps A through C of Example 1, to begin with known reagents and produce the amine reactants necessary to produce the quaternary ammonium salts of the invention.

What is claimed is:

1. A compound of the formula

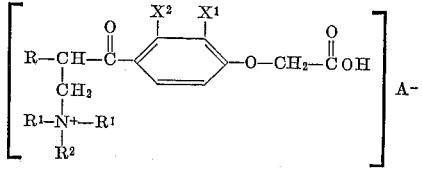

where R is a member selected from the group consisting of lower alkyl and trifluoromethyl-lower alkyl, R¹ and R² each represents lower alkyl, X¹ and X² each represents a member selected from the group consisting of hydrogen, halogen, lower alkyl, trifluoromethyl and, X¹ and X², taken together, form 1,3-butadienylene and A⁻ is a non-toxic, pharmacologically acceptable anion.

2. A compound of the formula

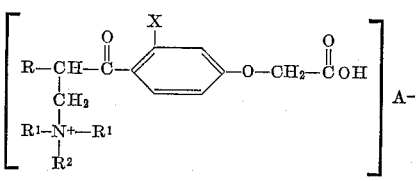

where R, R¹ and R² represent lower alkyl, X represents halogen and A⁻ is a non-toxic, pharmacologically acceptable anion.

3. A compound of the formula

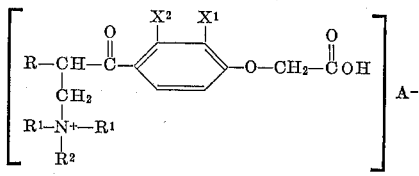

where R, R¹, R², X¹ and X² represent lower alkyl and A⁻ is a non-toxic, pharmacologically acceptable anion.

4. A compound of the formula

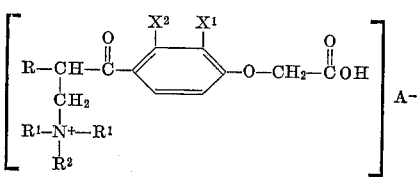

where R, R¹ and R² represent lower alkyl, X¹ and X² represent halogen, and A⁻ is a non-toxic, pharmacologically acceptable anion.

5. [3-fluoro-4-[2 - (trimethylammoniummethyl)butyryl]-phenoxy]acetic acid iodide.

6. [3-chloro-4-[2 - (1-benzylpiperidiniummethyl)-butyryl]phenoxy]acetic acid chloride.

7. [2,3-dichloro-4-[2-(trimethylammoniummethyl)-butyryl]phenoxy]acetic acid bromide.

8. [2,3-dimethyl-4-[2-(trimethylammoniummethyl)-butyryl]phenoxy]acetic acid iodide.

9. [4-[2 - (ethyl-dimethylammoniummethyl)butyryl]-naphthyloxy]acetic acid iodide.

10. [2,3 - dimethyl-4-[2-(trimethylammoniummethyl)-4,4,4-trifluorobutyryl]phenoxy]acetic acid iodide.

11. [3 - methyl-4-[2-(trimethylammoniummethyl) - 3-(trifluoromethyl)butyryl]phenoxy]acetic acid iodide.

References Cited

UNITED STATES PATENTS 3,121,723  2/1964  Kirchner _____ 260—326.3

ALEX MAZEL, *Primary Examiner.*

JOSE TOVAR, *Assistant Examiner.*